United States Patent
Baker (10) Patent No.: US 11,715,925 B2
(45) Date of Patent: Aug. 1, 2023

(54) POLARIZATION PRESERVING BIDIRECTIONAL OPTICAL ELEMENT

(71) Applicant: ARIZONA BOARD OF REGENTS ON BEHALF OF THE UNIVERSITY OF ARIZONA, Tucson, AZ (US)

(72) Inventor: Robert Dawson Baker, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 108 days.

(21) Appl. No.: 16/971,499

(22) PCT Filed: Feb. 20, 2019

(86) PCT No.: PCT/US2019/018702
§ 371 (c)(1),
(2) Date: Aug. 20, 2020

(87) PCT Pub. No.: WO2019/164894
PCT Pub. Date: Aug. 29, 2019

(65) Prior Publication Data
US 2020/0403372 A1    Dec. 24, 2020

Related U.S. Application Data

(60) Provisional application No. 62/632,618, filed on Feb. 20, 2018.

(51) Int. Cl.
*H01S 3/10*    (2006.01)
*G02F 1/01*    (2006.01)
(Continued)

(52) U.S. Cl.
CPC ........ *H01S 3/10061* (2013.01); *G02F 1/0136* (2013.01); *H01S 3/06716* (2013.01);
(Continued)

(58) Field of Classification Search
CPC .. H01S 3/06791; H01S 3/08013; H01S 3/083; H01S 3/1109; H01S 3/1115
See application file for complete search history.

(56) References Cited

U.S. PATENT DOCUMENTS 3,436,678 A * 4/1969 Sharp .................... G02F 1/21
                                                    372/98
4,756,607 A * 7/1988 Watanabe ............ G02F 1/093
                                                    359/324
(Continued)

FOREIGN PATENT DOCUMENTS

EP        0851266 A2    7/1998
JP        2004226599 A  8/2004

OTHER PUBLICATIONS

Whitenett, "Investigation of a Tunable Mode-Locked Fiber Laser for application to Multipoint Gas Spectroscopy," Mar. 2004, Journhal of Lightwave Technology, vol. 22, No. 23, pp. 813-819. (Year: 2004).*

*Primary Examiner* — Michael Carter
(74) *Attorney, Agent, or Firm* — Stuart H. Mayer; Mayer & Williams PC (57) ABSTRACT

An optical device includes first and second 45° Faraday rotators. A 45° polarizer is located between the first and second Faraday rotators such that light in a prescribed polarization state that is incident on the first 45° Faraday rotator traverses the first 45° Faraday rotator as well as the 45° polarizer and the second 45° Faraday rotator. In one implementation the optical device is operable to receive a light beam traveling in a first direction and output a light beam that is in a predetermined polarization state. Likewise, the optical device is operable to receive an unpolarized light beam traveling in a second direction opposite the first direction and outputs a light beam that is in a predetermined polarization state. The polarization state in which the two (Continued)

output beams are arranged may be the same or orthogonal to one another.

11 Claims, 5 Drawing Sheets

(51) Int. Cl.
  *H01S 3/067* (2006.01)
  *H01S 3/08* (2023.01)
  *H01S 3/1109* (2023.01)
  *H01S 3/1115* (2023.01)
  *H01S 3/16* (2006.01)

(52) U.S. Cl.
  CPC ...... *H01S 3/06791* (2013.01); *H01S 3/08013* (2013.01); *H01S 3/1109* (2013.01); *H01S 3/1115* (2013.01); *H01S 3/1608* (2013.01)

(56) References Cited

U.S. PATENT DOCUMENTS

| | | | |
|---|---|---|---|
| 5,448,579 A | 9/1995 | Chang | |
| 6,483,859 B1 * | 11/2002 | Drake, Jr. | H01S 3/2341 372/75 |
| 2006/0245456 A1 * | 11/2006 | Lasri | H01S 3/1118 372/18 |
| 2007/0211252 A1 | 9/2007 | Futami | |
| 2009/0122397 A1 | 5/2009 | Kubo | |

* cited by examiner

POLARIZATION PRESERVING BIDIRECTIONAL OPTICAL ELEMENT

BACKGROUND

Conventional optical isolators are optical components that transmit light in one direction but block it in the backward-propagating direction. They are used when the reversely-propagating light needs to be avoided. For example, optical isolators minimize light reflections into transmitting lasers, and thus reduce instabilities and system noise in optical and electro-optical systems.

A principal component of an optical isolator is a Faraday rotator, whose operation is based on the Faraday effect. The Faraday effect is a magneto-optical phenomenon that, as a result of interaction between light and a magnetic field in a medium, causes a rotation of a polarization vector of light wave by a degree that is linearly proportional to the strength of a component of the magnetic field collinear with the direction of propagation of light. The empirical angle of rotation of a linear polarization vector of a light wave is given by $\beta = VBd$, where $\beta$ is the angle of rotation (in radians), V is the Verdet constant for the material through which the light wave propagates, B is the magnetic flux density in the direction of propagation (in teslas), and d is the length of the path (in meters). The Verdet constant reflects the strength of the Faraday effect for a particular material. The Verdet constant can be positive or negative, with a positive Verdet constant corresponding to a counterclockwise rotation when the direction of propagation is parallel to the magnetic field.

SUMMARY

In accordance with one aspect of the subject matter described herein, an optical device is provided that includes first and second 45° Faraday rotators. A 45° polarizer is located between the first and second Faraday rotators such that light in a prescribed polarization state that is incident on the first 45° Faraday rotator traverses the first 45° Faraday rotator as well as the 45° polarizer and the second 45° Faraday rotator.

In accordance with another aspect of the subject matter described herein, an optical device is provided that includes first and second 45° Faraday rotators. A 45° polarizer is located between the first and second Faraday rotators. The first and second 45° Faraday rotators are arranged with respect to one another so that only optical energy that is in a first polarization state is able to propagate through the optical device when the optical energy is incident upon the optical device from a first direction and only optical energy that is in a second polarization state is able to propagate through the optical device when the optical energy is incident upon the optical device from a second direction opposite to the first direction. The first and second polarization states are orthogonal to one another.

In accordance with yet another aspect of the subject matter described herein, a bidirectional mode-locked laser is provided that includes an optical fiber cavity, a gain element, a mode-locking element and a bidirectional polarization element. The optical fiber cavity includes polarization-maintaining optical fiber. The gain element is located in the optical fiber cavity for amplifying optical signals propagating in the optical fiber cavity. The mode-locking element is located in the optical fiber cavity for mode-locking the laser cavity to thereby generate first and second optical pulse trains traveling in opposite directions in the optical fiber cavity. The bidirectional polarization element is located in the optical fiber cavity. The bidirectional polarization element is configured to only allow optical energy that is in a first polarization state to propagate therethrough in first and second directions. The first and second directions are opposite to one another and the first and second polarization states are orthogonal to one another. The bidirectional polarization element is located between two polarization-maintaining optical fiber segments in the optical fiber cavity that are oriented with respect to one another so that optical energy propagating in the respective optical fiber segments are in orthogonal polarization states with respect to one another.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Figure 1:
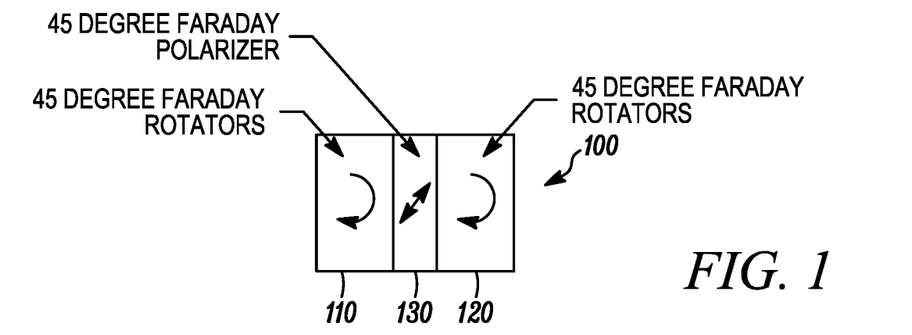
FIG. 1 shows one example of an optical arrangement that is referred to herein as a bidirectional polarization isolator.

FIG. 1 shows one example of an optical arrangement that is referred to herein as a bidirectional polarization isolator. As explained in more detail below, the isolator is operable to receive a light beam traveling in a first direction and output a light beam that is in a predetermined polarization state such as a linear polarization state. Likewise, the bidirectional polarization isolator is operable to receive an unpolarized light beam traveling in a second direction opposite to the first direction and once again output a light beam that is in a predetermined polarization state, which may also be a linear polarization state. The polarization state in which the two output beams are arranged may be the same or orthogonal to one another.

More specifically, the bidirectional polarization isolator 100 shown in FIG. 1 includes a first 45 degree Faraday rotator 110, a second 45 degree Faraday rotator 120 and a 45 degree polarizer 130 located between the first and second Faraday rotators 110 and 120. The first and second Faraday rotators 110 and 120 are arranged to rotate the polarization of incoming light in the same direction by 45 degrees.

In FIG. 1 and the figures that follow, the polarization states are assumed for purposes of illustration to be linear polarization states. One linear polarization state of light is represented by a vertical arrow and the orthogonal linear polarization state is represented by a horizontal arrow.

Figure 2A:
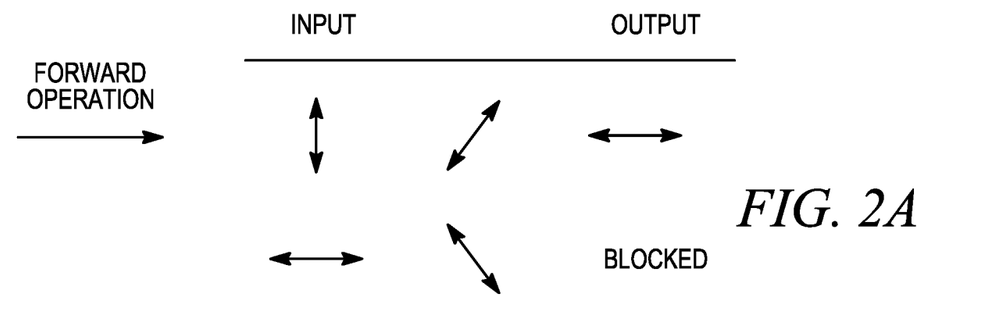
FIG. 2a shows the polarization state of an initially unpolarized optical beam as it propagates in the forward direction from left to right through the bidirectional polarization isolator of FIG. 1

FIG. 2a shows the polarization state of an initially unpolarized optical beam as it propagates from left to right through the bidirectional polarization isolator 100. That is, the beam is incident on first Faraday rotator 110 and exits the isolator 100 from second Faraday rotator 120. As shown, the vertical component of the incoming unpolarized optical beam is rotated by 45 degrees in the clockwise direction by the first Faraday rotator 110. Since the rotated component is now aligned with the polarization axis of polarizer 130, it passes through the polarizer 120 and is incident upon the second polarizer 130, which in turn further rotates the polarization state of the beam in the clockwise direction by an additional 45 degrees. Thus, a vertically polarized component of an optical beam is output from the bidirectional polarization isolator 100 in a horizontally polarized state.

As further shown in FIG. 2a, the horizontal component of the incoming unpolarized optical beam is also rotated by 45 degrees in the clockwise direction by the first Faraday rotator 110. However, since the rotated component is now in a polarization state orthogonal to the polarization axis of the polarizer 130, the beam will be blocked and consequently no light will be output by second Faraday rotator 120. Thus, the net result is that an unpolarized beam incident on the first Faraday rotator 110 produces a horizontally polarized beam at the output of the second Faraday rotator 120.

Figure 2B:
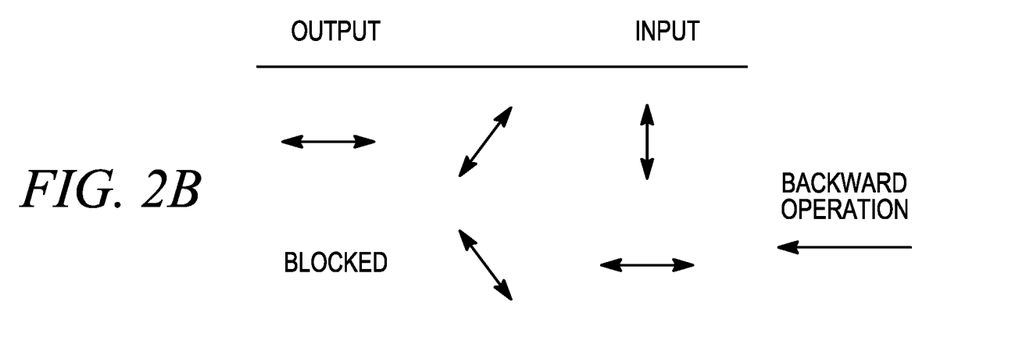
FIG. 2b shows the polarization state of an initially unpolarized optical beam as it propagates in the backward direction from right to left through the bidirectional polarization isolator of FIG. 1.

FIG. 2b shows the polarization state of an initially unpolarized optical beam as it propagates from right to left through the bidirectional polarization isolator 100. That is, the beam is incident on the second Faraday rotator 120 and exits the isolator 100 from the first Faraday rotator 120. As shown, the vertical component of the incoming unpolarized optical beam is rotated by 45 degrees in the clockwise direction by the second Faraday rotator 120. Since the rotated component is now aligned with the polarization axis of polarizer 130, it passes through the polarizer 130 and is incident upon the first Faraday rotator 110, which in turn further rotates the polarization state of the beam in the clockwise direction by an additional 45 degrees. Thus, a vertically polarized component of an optical beam is output from the bidirectional polarization isolator 100 in a horizontally polarized state As further shown in FIG. 2b, the horizontal component of the incoming unpolarized optical beam is also rotated by 45 degrees in the clockwise direction by the second Faraday rotator 120. However, since the rotated component is now in a polarization state orthogonal to the polarization axis of the polarizer 130, the beam will be blocked and consequently no light will be output by the first Faraday rotator 110. Thus, the net result is that an unpolarized beam incident on the first Faraday rotator 110 produces a horizontally polarized beam at the output of the second Faraday rotator 120.

As FIGS. 2a and 2b illustrate, an unpolarized optical beam incident on the bidirectional polarization isolator 100 from either the left (so that it is first incident on the first Faraday rotator 110) or the right (so that it is first incident on the second Faraday rotator 120) will output an optical beam in the horizontal polarization state.

The bidirectional polarization isolator 100 described herein may be used in a number of different applications. For example, as described below the bidirectional polarization isolator 100 may be used to facilitate mode-locking in a bidirectional mode-locked laser, which is used, among other things, to generate optical frequency combs. Such optical frequency combs may be employed in applications such as spectroscopy, precision range-finding and a wide variety of pump-probe experiments using asynchronous sampling.

In a mode-locked bidirectional laser, the various modes oscillate with fixed phases with respect to one another. In this way the laser modes will all periodically constructively interfere with one another, producing an intense burst or pulse of light. Such a laser is said to be mode-locked or phase-locked.

Figure 3:
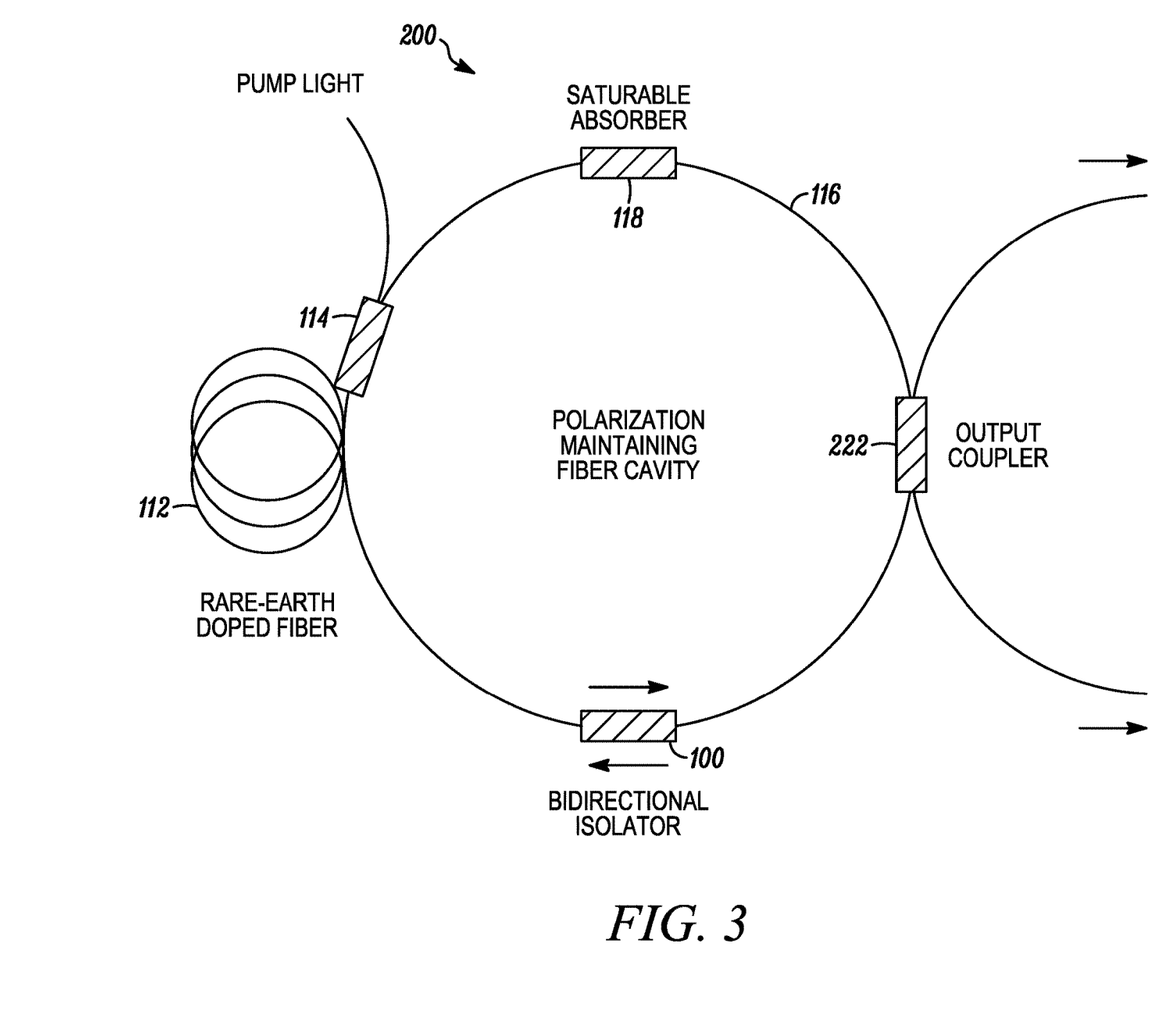
FIG. 3 shows one example of a bidirectional mode-locked laser in which the bidirectional polarization isolator described herein may be employed.

FIG. 3 shows one example of a bidirectional mode-locked laser 200. The laser 200 includes a polarization maintaining fiber 116 that defines a ring cavity. The laser also includes a rare-earth doped fiber 112 that serves as the gain element, a wavelength division multiplexer (WDM) or optical coupler 114 for injecting the pump power into the laser cavity, an 2×2 50/50 output coupler 222 for extracting bidirectional optical pulses, and the bidirectional polarization isolator 100. A saturable absorber 118 such as a carbon nanotube-based saturable absorber as the mode-locking element. By using a mode-locking element optical pulse trains traveling in opposite directions may be generated.

In one illustrative embodiment the rare-earth doped fiber 112 is an erbium doped fiber and the laser 200 operates at a wavelength of 1560 nm. Of course, in other embodiments mode-locked lasers using other rare-earth elements and operating at other wavelengths may be employed as well.

In the example shown in FIG. 3 the bidirectional mode-locked laser 200 is mode locked by a passive mode-locking technique in which an element is placed in laser cavity which causes self-modulation of the light. In the example of FIG. 3 the element is a saturable absorber, which has an intensity dependent transmission response. In general, passive mode-locking may be achieved using others suitable elements instead of a saturable absorber including, for instance, a semiconductor saturable absorber mirror (Sesam) or an arrangement that employs a nonlinear polarization evolution (NPE) mechanism. In other embodiments the bidirectional mode-locked laser may be mode-locked by an active mode-locking technique in which an external signal drives an optical modulator that modulates the light in the laser cavity. The optical modulator is typically located within the laser cavity itself.

In addition to different mode locking mechanisms, the bidirectional mode-locked laser may also employ various arrangements of fiber cavities that are different from the ring cavity shown in FIG. 3. For example, without limitation, linear cavities with Faraday rotator ends, figure-8 cavity arrangements and multiple ring arrangements may be employed. More generally, any laser cavity may be employed that can be mode-locked in a bidirectional manner.

Polarization effects can cause unwanted power and frequency modulation in laser systems generally. In particular, such effects can cause laser sources to become unstable when bidirectional lasing is desired. However, the deleterious impact of polarization on bidirectional lasing can be ameliorated by isolating the polarization states of the light within the bidirectional laser so that the light propagating in any given direction is in a single polarization state. For instance, in the laser cavity shown in FIG. 3 light propagating in a clockwise direction may be arranged to be in one polarization state and light propagating in the counterclockwise direction may be arranged to be in another polarization state. By arranging the polarization states in this way bidirectional mode-locked lasers may be self-starting without the need for control systems or technician input. Moreover, the light in each propagation direction may share common amplifier noise, making it possible to cancel a significant part of the timing instability that can arise in bidirectional mode-locked lasers.

Figure 4:
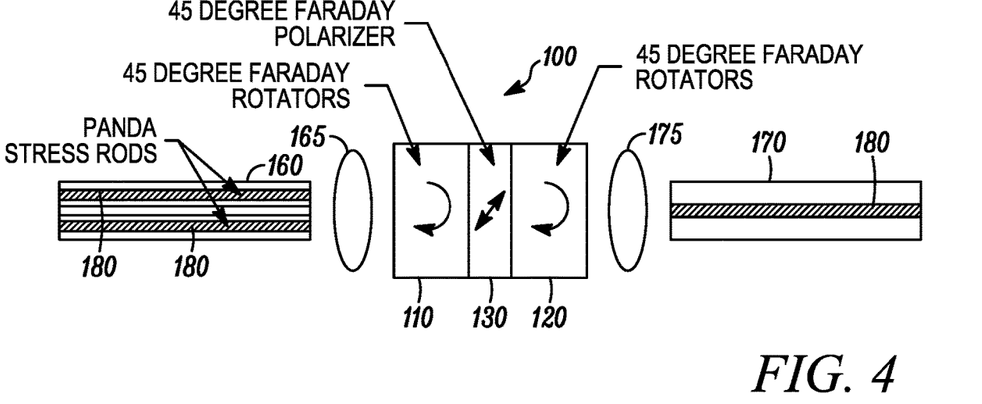
FIG. 4 shows a segment of the bidirectional mode-locked laser shown in FIG. 3 with the bidirectional polarization isolator of FIG. 1 inserted between two polarization maintaining optical fiber segments of the laser cavity.

The bidirectional polarization isolator 100 employed in the bidirectional mode-locking laser shown in FIG. 3 assigns a single linear polarization state to each propagation direction in the laser cavity. In this way the light propagating in the clockwise and counterclockwise directions each can be in a single polarization state. FIG. 4 shows a segment of the bidirectional mode-locking laser shown in FIG. 3 with the bidirectional polarization isolator 100 of FIG. 1 inserted between two polarization maintaining optical fiber segments 160 and 170 of the laser cavity. In this example, collimating lens 165 and 175 are employed between the fiber segments 160 and 170 and the bidirectional optical isolator 100 in FIG. 4 in order to couple the light between the fiber segments and the bidirectional optical isolator.

Figure 5A:
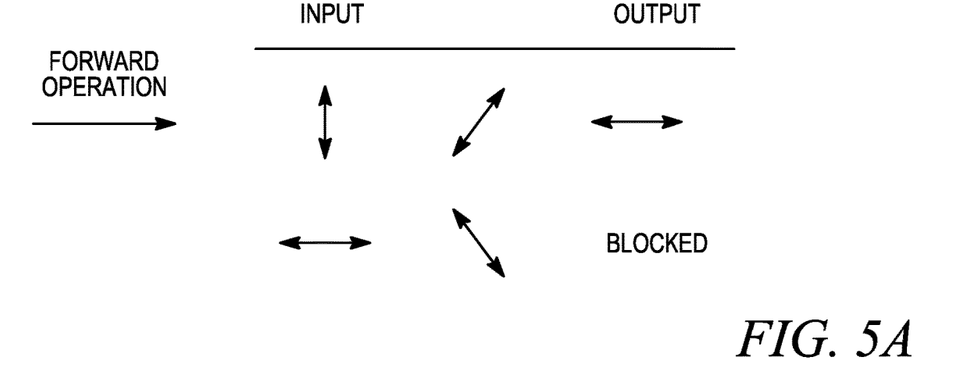
FIGS. 5a and 5b shows, respectively, the forward and backward operation of the bidirectional polarization isolator of FIG. 4.
Figure 5B:
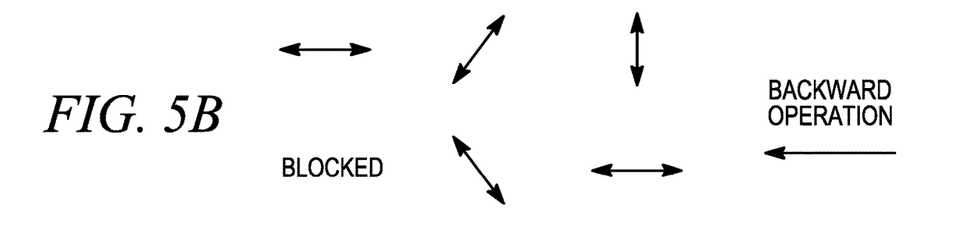

For convenience, FIGS. 5a and 5b shows the forward and backward operation of the bidirectional polarization isolator 100 of FIG. 4, which was previously shown in FIGS. 2a and 2b.

In the example of FIG. 3 the polarization maintaining optical fiber segments are Polarization Maintaining and Absorption Reducing (PANDA) fibers, which as shown, use stress rods 180 that are nominally circular in cross section. Other examples of polarization maintaining fibers that may be employed include, without limitation, "bow-tie" polarization maintaining fiber, in which the stress rods take the form of annular wedges, and elliptical clad polarization maintaining fiber, in which an elliptically shaped cladding generates the required stress field.

As shown, the two optical fiber segments 160 and 170 in FIG. 4 are rotationally oriented with respect to one another so that linearly polarized light propagating in them are orthogonal to one another. That is, the two optical fiber segments are rotated by 90° with respect to one another so that if the left-most fiber segment 160 supports, for example, vertically polarized light the right-most fiber segment 170 will support horizontally polarized light. The bidirectional optical isolator 100 serves to ensure that linearly polarized light is injected to each fiber segment of the laser cavity.

The length of each of the optical fiber segments in the laser cavity generally will depend on the application for which the bidirectional mode-locked laser is to be employed. For instance, for applications that require two opposite-going optical pulse trains to be generated which have similar but not identical repetition rates, the two segments may be approximately equal in length. In other applications that require the optical pulse trains to have significantly different repetition rates, the difference in the lengths of the two segments may be greater.

Figure 6:
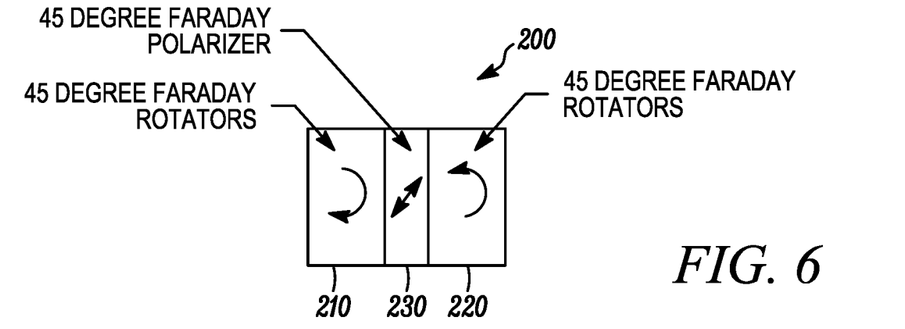
FIG. 6 shows another example of a bidirectional polarization isolator.
Figure 7A:
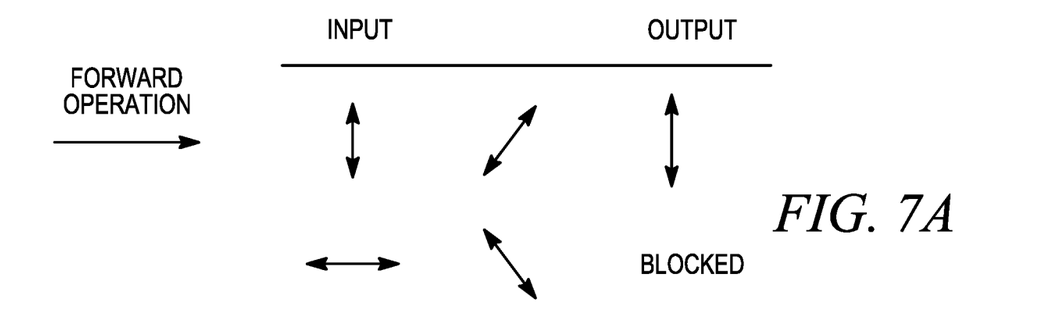
FIG. 7a shows the polarization state of an initially unpolarized optical beam as it propagates in the forward direction from left to right through the bidirectional polarization isolator of FIG. 6
Figure 7B:
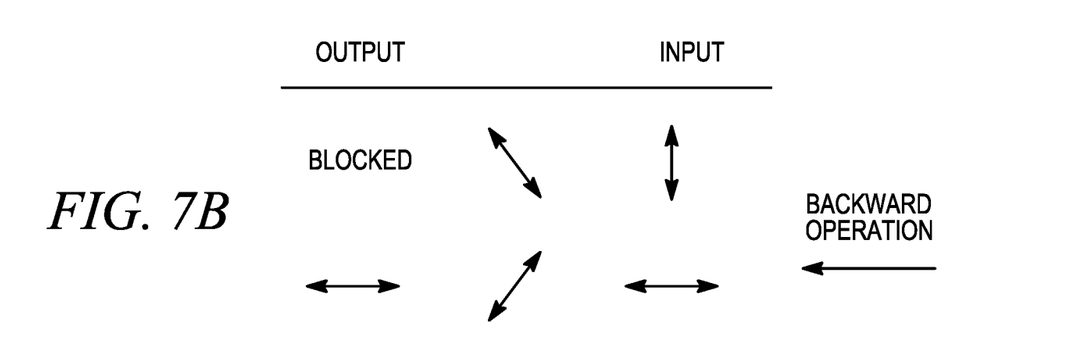
FIG. 7b shows the polarization state of an initially unpolarized optical beam as it propagates in the backward direction from right to left through the bidirectional polarization isolator of FIG. 6.

The example of the bidirectional polarization isolator described above outputs an optical beam in each of the two directions that are in the same polarization state. This is accomplished by using two 45° Faraday rotators that rotate the polarization state of light in the same direction. In one alternative embodiment, illustrated in FIG. 6, the bidirectional polarization isolator 200 includes two 45° Faraday rotators that rotate the polarization state of light in the opposite directions. For instance, in this example the first 45° Faraday rotator 210 rotates the polarization state in the clockwise direction and the second 45° Faraday rotator 220 rotates the polarization state in the counter-clockwise direction. FIG. 7a shows the polarization state of an initially unpolarized optical beam as it propagates from right to left through the bidirectional polarization isolator 200. Likewise, FIG. 7b shows the polarization state of an initially unpolarized optical beam as it propagates from right to left through the bidirectional polarization isolator 200. As shown, the bidirectional polarization isolator 200 outputs an optical beam in each of the two directions that are in opposite polarization states.

In some embodiments, the bidirectional polarization isolator may include additional optical components in addition to those shown in the figures above. For instance, in some cases a 45° half-wave plate may be employed. By way of illustration, the 45° half-wave plate may be inserted before the first 45° Faraday rotator 110 shown in FIG. 1 or the first 45° Faraday rotator 210 shown in FIG. 5. Alternatively, the 45° half-wave plate may be inserted after the second 45° Faraday rotator 120 shown in FIG. 1 or the second 45° Faraday rotator 220 shown in FIG. 5. The 45° half-wave plate will reflect a linear polarization state about a 45° axis and rotate a horizontally polarized state to a vertically polarized state and vice versa. As a consequence, when a bidirectional polarization isolator incorporating a 45° half-wave plate is employed in a bidirectional mode-locked layer, it is not necessary to rotate the different fiber segments with respect to one another so that linearly polarized light propagating in them are orthogonal to one another. That is, the different fiber segments do not need to use a 90° splice, but rather may be spliced so that they support the same linear polarization state.

Figure 8:
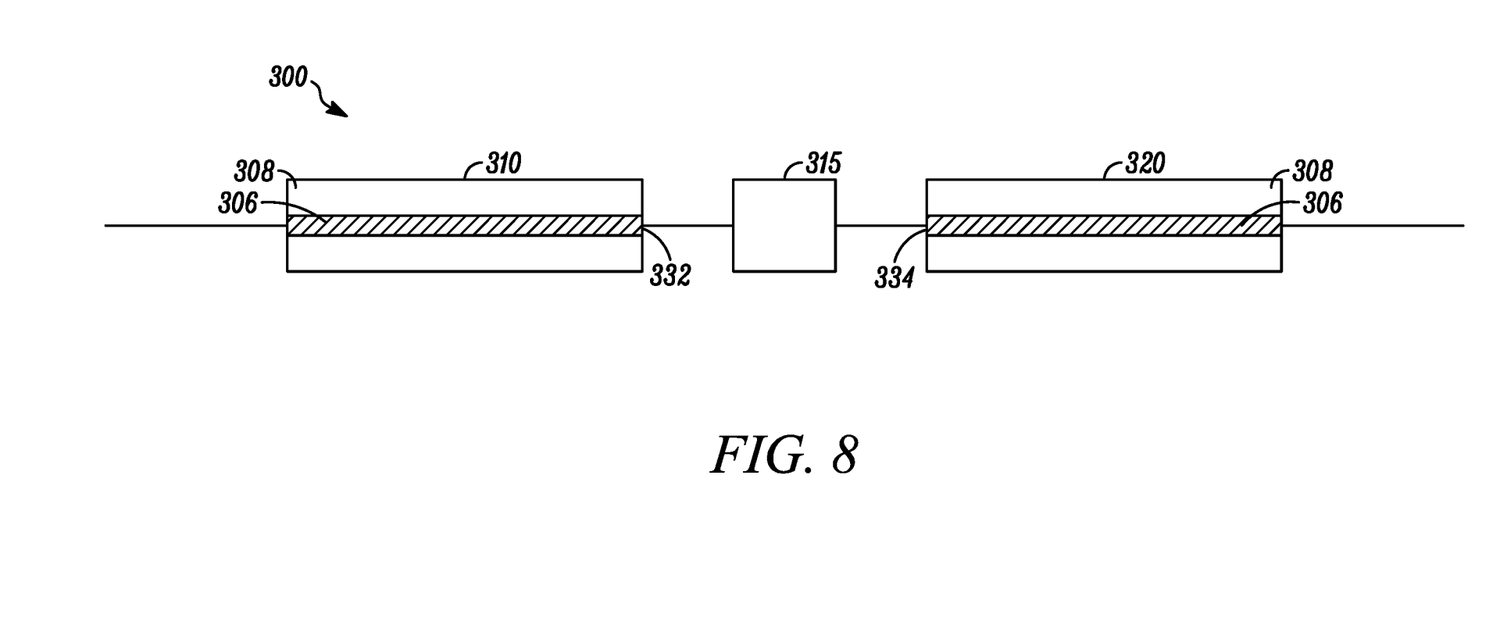
FIG. 8 shows one example of the bidirectional polarization isolator of FIG. 1 having an all fiber configuration.

The bidirectional polarization isolators described herein may be produced in a variety of different configurations or types, including, for instance, in bulk, free space configurations, integrated optical configuration that allow for monolithic integration with other optical components (e.g., solid state ring lasers), and all fiber configurations. FIG. 8 shows one example of the bidirectional polarization isolator of FIG. 1 having an all fiber configuration, which may be particularly suitable for use in a bidirectional mode-locked fiber laser such as shown in FIG. 3. In this configuration the Faraday rotator that is employed is a a single-mode fiber or a multi-mode fiber that is doped with rare-earth material(s). As shown, optical isolator 300 includes a fiber-optic based polarizer 315, a first Faraday rotator 310 and a second Faraday rotator 320. Each Faraday rotator 310 and 320 includes a fiber optic component 306 disposed within a magnetic cell 308 (shaped, for example, as a tube). The magnetic flux density of the magnetic cell 308 should be strong enough to produce a 45 degree polarization rotation when the light passes through the Faraday rotator. The ends of the fiber-optic components 306 are fusion-spliced with corresponding ends of the fiber polarizer 315 (as shown schematically by fiber-fusion splicing joints 332 and 334), thereby creating an all-fiber-optic based device. The fiber optic components 306 used in the first and second Faraday rotators 310 and 320, may be doped with a rare-earth oxide such, for example, as at least one of $Pr_2O_3$, $Nd_2O_3$, $P_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, and $Lu_2O_3$.

As previously mentioned, the bidirectional polarization isolator described herein may be employed in a wide variety of different laser configurations in which polarization multiplexed, dual optical frequency combs are desired. Illustrative laser topologies in which the bidirectional polarization isolator may be employed are found the following references: Michael Kolano, Benedict Gräf, Stefan Weber, Daniel Molter, and Georg von Freymann, "Single-laser polarization-controlled optical sampling system for THz-TDS," Opt. Lett. 43, 1351-1354 (2018); Xin Zhao, Ting Li, Ya Liu, Qian Li, and Zheng Zheng, "Polarization-multiplexed, dual-comb all-fiber mode-locked laser," Photon. Res. 6, 853-857 (2018); Karol Krzempek, Dorota Tomaszewska, and Krzysztof M. Abramski, "Dissipative soliton resonance mode-locked all-polarization-maintaining double clad Er:Yb fiber laser," Opt. Express 25, 24853-24860 (2017); and Takuro Ideguchi, Tasuku Nakamura, Yohei Kobayashi, and Keisuke Goda, "Kerr-lens mode-locked bidirectional dual-comb ring laser for broadband dual-comb spectroscopy," Optica 3, 748-753 (2016).

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

The invention claimed is:

1. A bidirectional mode-locked laser, comprising:
an optical fiber cavity that includes polarization-maintaining optical fiber;
a gain element located in the optical fiber cavity for amplifying optical signals propagating in the optical fiber cavity;
a mode-locking element located in the optical fiber cavity for mode-locking the laser cavity to thereby generate first and second optical pulse trains traveling in opposite directions in the optical fiber cavity; and
a bidirectional polarization element located in the optical fiber cavity, the bidirectional polarization element being configured to only allow optical energy that is in a first polarization state to propagate therethrough in first and second directions, the first and second directions being opposite to one another and the first polarization state being orthogonal to a second polarization state, the bidirectional polarization element being located between two polarization-maintaining optical fiber segments in the optical fiber cavity that are oriented with respect to one another so that optical energy propagating in the respective optical fiber segments are in orthogonal polarization states with respect to one another, wherein the bidirectional polarization element outputs the optical energy in the second polarization state orthogonal to the first polarization state.

2. The bidirectional mode-locked laser of claim 1, wherein the first and second polarization states are linear polarization states.

3. The bidirectional mode-locked laser of claim 1, wherein the two polarization-maintaining optical fiber segments are equal in length.

4. The bidirectional mode-locked laser of claim 1, wherein the two polarization-maintaining optical fiber segments are unequal in length.

5. The bidirectional mode-locked laser of claim 1, wherein the mode-locking element is configured for use with a passive mode-locking technique.

6. The bidirectional mode-locked laser of claim 5, wherein the mode-locking element includes a saturable-absorber.

7. The bidirectional mode-locked laser of claim 1, wherein the mode-locking element is configured for use with an active mode-locking technique.

8. The bidirectional mode-locked laser of claim 7, wherein the mode-locking element includes an optical modulator.

9. The bidirectional mode-locked laser of claim 1, wherein the gain element includes a rare-earth doped optical fiber.

10. The bidirectional mode-locked laser of claim 9, wherein the rare-earth doped optical fiber is an erbium-doped optical fiber.

11. The bidirectional mode-locked laser of claim 1, wherein the bidirectional polarization element includes first and second 45° Faraday rotators and a 45° polarizer located between the first and second 45° Faraday rotators.

* * * * *